United States Patent
Xu et al.

(10) Patent No.: US 12,488,124 B2
(45) Date of Patent: Dec. 2, 2025

(54) TAKING ACTION BASED ON DATA EVOLUTION

(71) Applicant: International Business Machines Corporation, Armonk, NY (US)

(72) Inventors: Jing James Xu, Xi'an (CN); Si Er Han, Xi'an (CN); Lei Gao, Xi'an (CN); Xue Ying Zhang, Xi'an (CN); Jing Xu, Xi'an (CN); Jin Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 17/302,293

(22) Filed: Apr. 29, 2021

(65) Prior Publication Data
US 2022/0350908 A1    Nov. 3, 2022

(51) Int. Cl.
| G06F 21/62 | (2013.01) |
| G06F 16/901 | (2019.01) |
| G06F 16/906 | (2019.01) |
| G06F 18/21 | (2023.01) |
| G06F 18/2321 | (2023.01) |
| G06F 18/2413 | (2023.01) |

(52) U.S. Cl.
CPC ........ G06F 21/6218 (2013.01); G06F 16/901 (2019.01); G06F 16/906 (2019.01); G06F 18/2193 (2023.01); G06F 18/2321 (2023.01); G06F 18/24137 (2023.01)

(58) Field of Classification Search
CPC .......... G06F 16/9536; G06F 18/24137; G06F 16/901; G06F 21/6218; G06F 18/2321; G06F 18/2193; G06F 16/906

USPC ......................................................... 726/26
See application file for complete search history.

(56) References Cited

U.S. PATENT DOCUMENTS

| 7,353,218 | B2 | 4/2008 | Aggarwal et al. |
| 8,838,593 | B2 * | 9/2014 | Apanowicz ............. H03M 7/30 707/791 |
| 9,336,259 | B1 * | 5/2016 | Kane ................... G06F 11/3409 |
| 9,336,302 | B1 * | 5/2016 | Swamy ............... G06F 16/2465 |
| 10,284,587 | B1 * | 5/2019 | Schlatter ............. H04L 63/1441 |
| 10,445,742 | B2 * | 10/2019 | Prendki ............. G06Q 30/0643 |

(Continued)

FOREIGN PATENT DOCUMENTS

| EP | 3739356 A1 * | 11/2020 | ............. G01P 15/18 |
| IN | 202041032212 A | 8/2018 | |

OTHER PUBLICATIONS

Author(s):Liu, Y Title: A unified framework for markey segmentation and its application Journal: Elsevier [online]. Publication date: 2012.[retrieved on: Jun. 11, 2023 ]. Retrieved from the Internet: < URL: https://www.sciencedirect.com/science/article/pii/S0957417412004241> (Year: 2012).*

(Continued)

*Primary Examiner* — Igor N Borissov
(74) *Attorney, Agent, or Firm* — Yee & Associates, P.C.

(57) ABSTRACT

Data segmentation, analysis, and security is provided. An analysis of a set of generated data evolution paths corresponding to a set of data collected over a defined span of time is performed. A behavior trend is determined based on analysis of the set of generated data evolution paths. A set of action steps is performed automatically based on the determined behavior trend.

16 Claims, 4 Drawing Sheets

(56) References Cited

U.S. PATENT DOCUMENTS

| | | | |
|---|---|---|---|
| 11,704,683 B1* | 7/2023 | Rosen | H04L 41/16 |
| | | | 705/7.33 |
| 2006/0112146 A1 | 5/2006 | Song et al. | |
| 2018/0121942 A1 | 5/2018 | Vlassis et al. | |
| 2020/0126126 A1* | 4/2020 | Briancon | G06N 20/20 |
| 2020/0320548 A1* | 10/2020 | Fusillo | G06F 18/24137 |
| 2020/0387797 A1* | 12/2020 | Ryan | G06N 3/084 |
| 2021/0160263 A1* | 5/2021 | Jiang | H04L 63/20 |

OTHER PUBLICATIONS

Author(s): Herhausen Title: Loyalty formation for different customer journey segments Journal: Elsevier [online]. Publication date: 2019.[retrieved on: Jan. 13, 2024]. Retrieved from the Internet: < URL: https://www.sciencedirect.com/science/article/pii/S0022435919300247> (Year: 2019).*

Author(s): Cordewener Title: Customer journey identification Journal: EUT [online]. Publication date: 2016. [retrieved on: Jun. 1, 2024]. Retrieved from the Internet: < URL:https://pure.tue.nl/ws/portalfiles/portal/46944566/855255-1.pdf> (Year: 2016).*

Author(s): Zhuo Title: Secuirty issues Journal: Nature [online]. Publication date: 2021.[retrieved on: Nov. 26, 2024]. Retrieved from the Internet: < URL:https://www.nature.com/articles/s41598-021-01638-z> (Year: 2021).*

Yuan et al., "A Data-Driven Customer Segmentation Strategy Based on Contribution to System Peak Demand," IEEE Transactions on Power Systems, vol. 35, Issue 5, Mar. 2020, 10 pages.

Xue et al., "Digital & Payments Behavioral Customer Segmentation with Fraud Analytics," GuardianAnalytics, Jun. 24, 2019. https://www.youtube.com/watch?v=yn1JH756qK8.

"Dynamic Customer Segmentation: The Next Evolution in Marketing," simMachines Inc., retrieved Feb. 11, 2021, 10 pages. https://simmachines.com/dynamic-customer-segmentation/.

Nandakumar, "Evolution of Customer Segmentation," LinkedIn, copyright 2020, Nov. 28, 2016, 4 pages. https://www.linkedin.com/pulse/evolution-customer-segmentation-priya-ragavi-nandakumar.

Verdenhofs et al., "Evolution of Customer Segmentation in the Era of Big Data," Marketing and Management of Innovations, Issue 1, Jan. 2009, 6 pages.

Docters et al., "Segments in Time," Strategy+Business, Consumer & Retail, Jan. 1, 1997, First Quarter 1997, Issue 6, originally published by Booz & Company, retrieved Apr. 28, 2021, 14 pages. https://www.strategy-business.com/article/9325?gko=34c2a.

Anonymously, "System and Method of Dynamic Customer Segmentation for Utility Customers," An IP.com Prior Art Database Technical Disclosure, IPCOM000211732D, Oct. 14, 2011, 3 pages.

Luo et al., "Tracking the Evolution of Customer Purchase Behavior Segmentation via a Fragmentation-Coagulation Process," Proceedings of the Twenty-Sixth International Joint Conference on Artificial Intelligence (IJCAI-17), 2017, 7 pages.

* cited by examiner

TAKING ACTION BASED ON DATA EVOLUTION

BACKGROUND

1. Field

The disclosure relates generally to data segmentation, analysis, and security and more specifically to generating customer data evolution paths using customer data segmentations corresponding to different time periods within a defined time span to discover customer behavior patterns and trends over time and performing appropriate action steps when an abnormal pattern or trend is detected via analyzing the generated customer data evolution paths.

2. Description of the Related Art

Data segmentation is the process of dividing data into a number of groups of similar datasets based on factors, such as, for example, types of data, characteristics of the data, and the like, so that the data can be used more efficiently and effectively. Data analysis is a process of inspecting and modeling the data with a goal of discovering useful information, extracting insights, informing conclusions, and supporting decision-making. Several methods and techniques exist to perform data analysis depending on the domain of the data and the aim of the analysis. Data security is the process of protecting the data using policies that identify the relative importance of the different datasets, sensitive nature of the different datasets, and regulatory compliance requirements corresponding to the different datasets, and then applying appropriate policies to secure a given dataset. Elements of data security may include confidentiality, integrity, and availability. These elements can be used as a guide to keep sensitive data protected from unauthorized access.

SUMMARY

According to one illustrative embodiment, a computer-implemented method for data segmentation, analysis, and security is provided. A computer performs an analysis of a set of generated data evolution paths corresponding to a set of data collected over a defined span of time. The computer determines a behavior trend based on analysis of the set of generated data evolution paths. The computer performs a set of action steps automatically based on the determined behavior trend. According to other illustrative embodiments, a computer system and computer program product for data segmentation, analysis, and security are provided.

DETAILED DESCRIPTION

Figure 1:
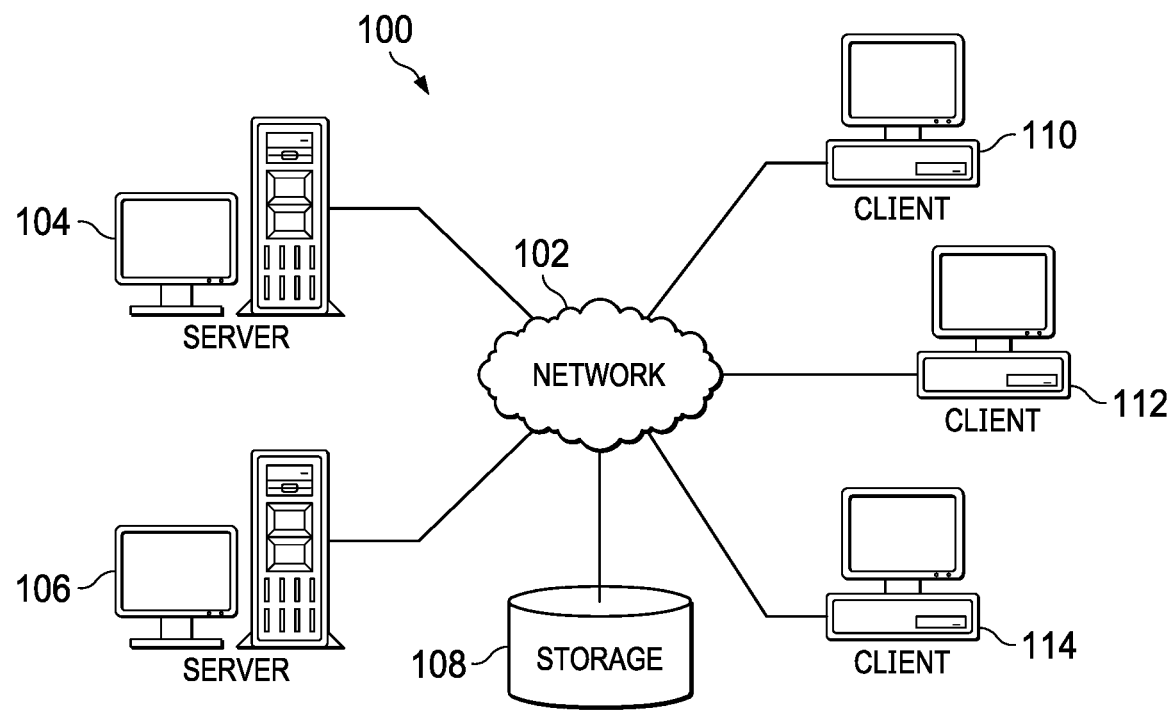
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
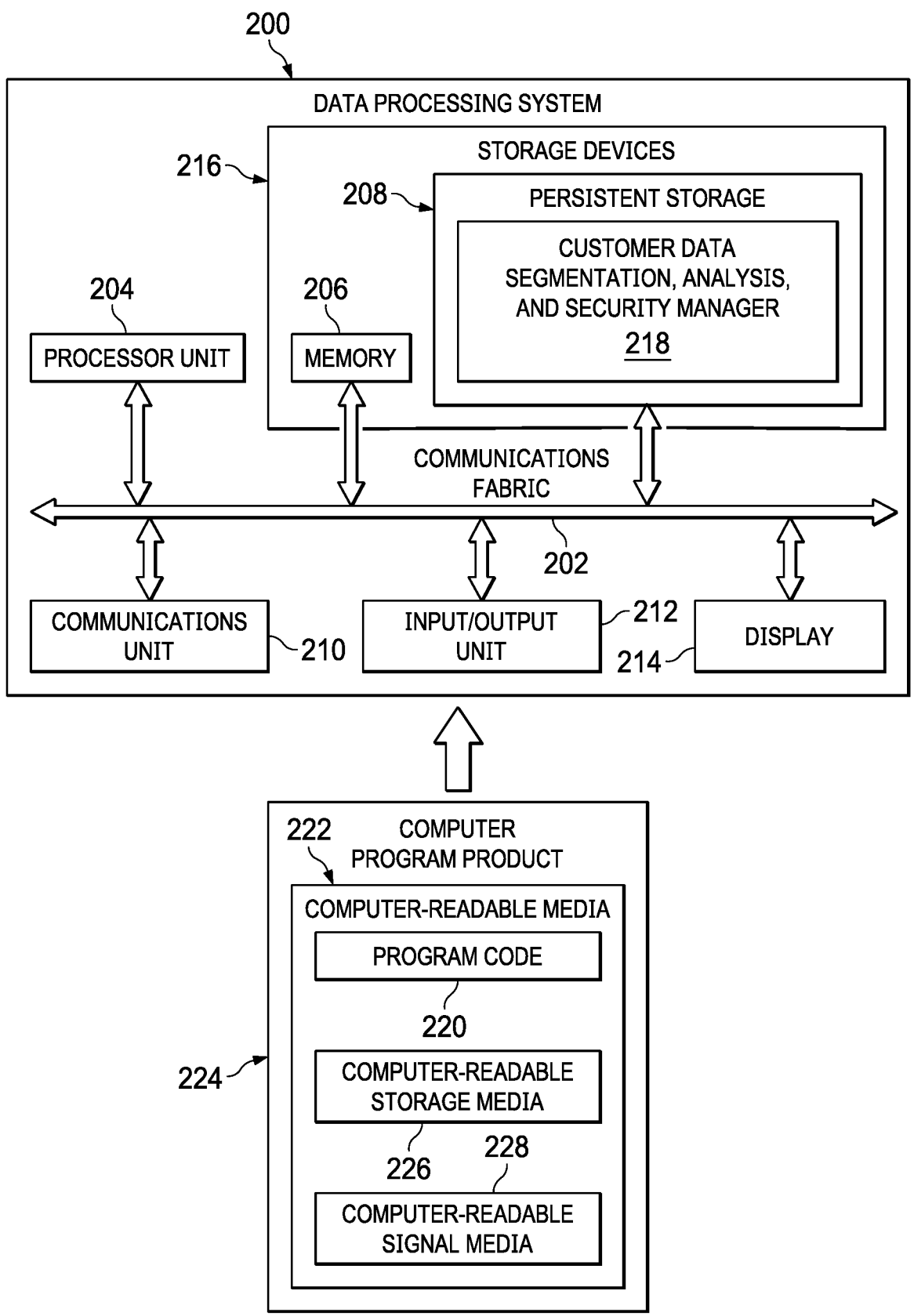
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 can provide customer services, such as, for example, banking services, financial services, entertainment services, governmental services, educational services, healthcare services, data services, and the like, to client device users. Further, server 104 and server 106 can perform customer data segmentation and analysis on customer data stored in at least one of server 104, server 106, or storage 108 to identify customer behavior patterns and trends over time by generating customer data evolution paths from linked customer data segmentations corresponding to different time periods. Furthermore, server 104 and server 106 can automatically perform data security measures (e.g., alert a system administrator, suspend customer account activity, terminate network connections, and the like) when an abnormal behavior pattern or trend (e.g., unauthorized data access) is detected by analyzing the generated customer data evolution paths.

Also, it should be noted that server 104 and server 106 may each represent a cluster of servers in one or more data centers. Alternatively, server 104 and server 106 may each represent multiple computing nodes in one or more cloud environments. Moreover, server 104 and server 106 may be owned or operated by an entity, such as, for example, an enterprise, business, company, organization, institution, agency, or the like.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, and the like, with wire or wireless communication links to network 102. Users of clients 110, 112, and 114 may utilize clients 110, 112, and 114 to access and utilize the customer services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, and customer data, such as, for example, transaction data, account data, customer profile data, security risk data, and any other type of customer-related data. Furthermore, storage 108 may store other types of data, such as, for example, authentication or credential data that may include usernames and passwords associated with client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the customer data segmentation, analysis, and security processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores customer data segmentation, analysis, and security manager 218. However, it should be noted that even though customer data segmentation, analysis, and security manager 218 is illustrated as residing in persistent storage 208, in an alternative illustrative embodiment customer data segmentation, analysis, and security manager 218 may be a separate component of data processing system 200. For example, customer data segmentation, analysis, and security manager 218 may be a hardware component coupled to communication fabric 202 or a combination of hardware and software components. In another alternative illustrative embodiment, a first set of components of customer data segmentation, analysis, and security manager 218 may be located in data processing system 200 and a second set of components of customer data segmentation, analysis, and security manager 218 may be located in a second data processing system, such as, for example, server 106 in FIG. 1.

Customer data segmentation, analysis, and security manager 218 controls the process of segmenting a set of customer data using a clustering algorithm, generating customer data evolution paths by determining successor customer data segmentations from different time periods within a defined span of time, analyzing the customer data evolution paths to detect when customer behavior patterns and trends are appearing, disappearing, or transforming, and performing appropriate action steps corresponding to the appearance, disappearance, or transformation of customer behavior patterns and trends. For example, when customer data segmentation, analysis, and security manager 218 identifies an appearance of an abnormal behavior pattern (e.g., unauthorized data access) by analyzing the customer data evolution paths, customer data segmentation, analysis, and security manager 218 automatically performs steps to eliminate or mitigate the detected abnormal behavior to increase data security.

As a result, data processing system 200 operates as a special purpose computer system in which customer data segmentation, analysis, and security manager 218 in data processing system 200 enables increased security of customer data by generating customer data segmentations in different time periods, linking customer data segmentations in the different time periods to form customer data evolution paths, analyzing the customer data evolution paths to identify appearance of abnormal behavior patterns, and automatically taking appropriate action steps regarding the abnormal behavior. In particular, customer data segmentation, analysis, and security manager 218 transforms data processing system 200 into a special purpose computer system as compared to currently available general computer systems that do not have customer data segmentation, analysis, and security manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Segmentation of customer data can enable customer behavior analysis for understanding the behavior characteristics of different customer groups. However, such data segmentations are typically only a simple snapshot of the different customer groups. A larger-scale analysis of the evolution and development of customer data corresponding to the different customer groups over time is needed to determine whether some customer behavior trends appear, disappear, or transform into other behavior trends and determine whether connections or links exist between different customer groups in different time periods.

For example, in banking, unauthorized access methods change rapidly, while new unauthorized access methods continue to emerge. These unauthorized access methods have common patterns and trends associated with them in time scale. As a result, a need exists to understand these common patterns and trends of unauthorized access in time scale, summarize these common patterns and trends, detect when unauthorized access is occurring based on the summarized common patterns and trends, and perform appropriate countermeasures when unauthorized access is detected to increase data security.

Illustrative embodiments identify customer data evolution over time and assess new customer data segmentations against historic characteristics of customer data evolution paths and their phases. Illustrative embodiments generate customer data segmentations for each defined time period using a clustering algorithm and profile each of the customer data segmentations to determine statistical characteristics of each respective segmentation. For each customer data segmentation in one time period, illustrative embodiments calculate a successor data segmentation in a next time period to form a customer data evolution path based on the statistical characteristic profiling of each customer data segmentation. Illustrative embodiments summarize each customer data evolution path in a common profile that includes the statistical characteristics corresponding to the path and each phase in the path. It should be noted that when illustrative embodiments assign a customer data segmentation to a particular customer data evolution path, that customer data segmentation becomes a phase of that particular path. In other words, a customer data segmentation is a phase when located in a customer data evolution path.

Subsequently, illustrative embodiments assess a newly detected customer data segmentation in new incoming customer data against the common profile of historic customer data evolution paths to determine which historic customer data evolution path and phase the newly detected customer data segmentation belongs to. Further, illustrative embodiments perform an analysis of the customer data evolution paths corresponding to a defined span of time to determine whether a set of new customer behavior tends are appearing, a set of existing customer behavior trends are disappearing, or a set of existing customer trends are transforming to one or more other customer behavior trends. Furthermore, illustrative embodiments perform a set of action steps based on determined changes in customer behavior trends. For example, if illustrative embodiments detect that an abnormal behavior pattern (e.g., unauthorized access) is appearing, then illustrative embodiments can, for example, send an alert notifying a system administrator of that abnormal behavior pattern, automatically perform a set of countermeasures corresponding to that abnormal behavior pattern, and the like. As another example, if illustrative embodiments detect that a customer attrition behavior pattern is appearing, then illustrative embodiments can, for example, send an alert notifying a marketing department of that attrition pattern, automatically develop new customer retention strategies, and the like.

To analyze customer data segmentations, illustrative embodiments collect a set of features, variables, or attributes representing customers in detail with quantified descriptions. Using customer data segmentation analysis in a particular data domain, such as, for example, banking, illustrative embodiments represent each customer by a vector (e.g., record), which includes a plurality of values. These values may come from one or more data sources, such as, for example, customer account information, customer transaction records, customer footprint details, customer account security risk information, and the like.

To discover customer data evolution over time, customer information should be collected over a sufficient time span. The time span should be long enough to reflect a trend in behavior patterns corresponding to customer data segmentations. Using customer data segmentation analysis in banking, for example, the data should include customer records over several months. Assume a month is an adequate time span to provide a snapshot of different customer behavior patterns and a several month time span is adequate to show a trend in the customer behavior patterns.

Illustrative embodiments generate a predefined number of customer data segmentations for each defined time period. The defined time period may be, for example, one month. However, it should be noted that the defined time period may be any increment of time, such as, for example, an hour, a day, a week, a month, a year, or the like. Also, in one illustrative embodiment, no overlap exists between defined time periods so that all customer data in one time period is a separate customer data segmentation for analysis. In addition, the predefined number of customer data segmentations may be user-defined or system-defined based on specified criteria.

Illustrative embodiments utilize a clustering algorithm, such as, for example, a K-means clustering algorithm, density-based spatial clustering algorithm, Gaussian mixture model algorithm, balance iterative reducing and clustering using hierarchies algorithm, affinity propagation clustering algorithm, mean shift clustering algorithm, ordering points to identify the clustering structure algorithm, or the like, to generate the customer data segmentations. Illustrative embodiments generate a user-defined number ("N") of segmentations, such as, for example, $Seg_{Feb\_1}$, $Seg_{Feb\_2}$, ..., $Seg_{Feb\_N}$. Alternatively, illustrative embodiments may automatically define the number of customer data segmentations based on specified criteria. It should be noted that in this example the defined time period is represented by the month of February. Illustrative embodiments calculate a cluster centroid for each customer data segmentation, such as, for example, $\mu_{Feb\_1}$, $\mu_{Feb\_2}$, ..., $\mu_{Feb\_N}$. Illustrative embodiments also calculate a kernel distance to define kernel area for each customer data segmentation using the equation: Kernel_d=Q1(di), where di represents the distances of records to their corresponding cluster centroid and Q1(di) represents the first quartile value of di. This equation provides a kernel distance for each customer data segmentation, such as, for example, $Kernel\_d_{Feb\_1}$, $Kernel\_d_{Feb\_2}$, ..., $Kernel\_d_{Feb\_N}$. Illustrative embodiments repeat this process so that illustrative embodiments can generate the customer data segmentations and calculate their corresponding cluster centroids and kernel distances every month for a defined number of month (i.e., every time period in a defined span of time).

Illustrative embodiments calculate a successor customer data segmentation for each customer data segmentation to form a customer data evolution path. For example, for a given customer data segmentation Segt_i in defined time period t, illustrative embodiments identify whether there is a successor customer data segmentation SucSegt_i in time period t+1. Illustrative embodiments calculate cluster centroid distances between every customer data segmentation in time period t+1 and the cluster centroid of Segt_i. If illustrative embodiments determine that a cluster centroid distance of a particular customer data segmentation is less than Kernel_dt_i (i.e., the kernel distance of Segt_i), then illustrative embodiments determine that that particular customer data segmentation Segt+1_j is a successor customer data segmentation of Segt_i, denoted as successor SucSegt_i. In other words, that particular customer data segmentation, which illustrative embodiments validated by the above condition for Segt_i in time period t, is successor SucSegt_i of Segt_i in period t+1.

After illustrative embodiments calculate successor customer data segmentations, illustrative embodiments identify a set of customer data evolution paths. In other words, illustrative embodiments link customer data segmentations to valid successors in a next defined time period to form customer data evolution paths. The first customer data segmentation in a customer data evolution path is known as the origin. The origin customer data segmentation and all successor customer data segmentations are respective phases of that particular customer data evolution path. For example, a customer data evolution path can be represented as: $EvPath_i = Seg_{t\_i} \rightarrow Seg_{t+1\_j} \rightarrow Seg_{t+2\_l} \rightarrow \ldots \rightarrow Seg_{t+n\_s}$, where $Seg_{t\_i}$ is the origin customer data segmentation of the customer data evolution path and $Seg_{t+1\_j}$, $Seg_{t+2\_l}$, to $Seg_{t+n\_s}$ are the successor customer data segmentations, which together comprise all the respective phases of that particular customer data evolution path (i.e., $EvPath_i$). Also, it should be noted that $Seg_{t+n\_s}$ represents the last phase in that particular customer data evolution path because illustrative embodiments could not identify a successor segmentation to $Seg_{t+n\_s}$ in period t+n+1.

Further, for a given customer data evolution path, illustrative embodiments summarize that customer data evolution path in a common profile. The common profile includes statistical characteristics, such as, for example, position of the customer data evolution path and dispersion of the customer data evolution path. Illustrative embodiments calculate the position of the customer data evolution path, which is weighted cluster centroids for all the phases in that particular customer data evolution path, using the equation:

$$\mu_{Path} = \frac{1}{\sum_{t=0}^{n} n_t} \sum_{t=0}^{n} n_t \times \mu_t,$$

here $n_t$ and $\mu_t$ are the number of cases and cluster centroids in the path. Illustrative embodiments calculate the dispersion of that particular customer data evolution path, which is weighted distances between the customer data evolution path position and the cluster centroid of each respective phase in that evolution path, using the equation $$\eta_{Path} = \frac{1}{\sum_{t=0}^{n} n_t} \sum_{t=0}^{n} n_t \times |\mu_t - \mu_{Path}|.$$

For each phase in that particular customer data evolution path, illustrative embodiments summarize statistical characteristics of that particular phase in the common profile as well. The statistical characteristics of the phase include deviation of the phase from the customer data evolution path and deviation of the phase from the origin of the customer data evolution path. Illustrative embodiments calculate phase deviation from the customer data evolution path, which is a distance from the cluster centroid of that phase to the position of the customer data evolution path, using the equation: $Dev_{Path} = |\mu_t - \mu_{Path}|$. Illustrative embodiments calculate phase deviation from the origin, which is a distance from the cluster centroid of that phase to the cluster centroid of the first phase (i.e., origin) in the customer data evolution path, using the equation: $Dev_{Orig} = |\mu_t - \mu_o|$, where $\mu_o$ is the cluster centroid of the first phase o in the path.

Moreover, illustrative embodiments assess a new customer data segmentation against the common profile of historical customer data evolution paths. For a newly discovered customer data segmentation in new incoming data, illustrative embodiments assess the newly discovered customer data segmentation to determine which customer data evolution path and phase the newly discovered customer data segmentation belongs to. For example, when the kernel distance of the new customer data segmentation to the customer data evolution path position is less than the weighted median of kernel distances of all phases in a particular customer data evolution path, illustrative embodiments determine that the new customer data segmentation belongs to that particular customer data evolution path. In addition, when the kernel distance of the new customer data segmentation (Kernel_dSegnew) is less than the kernel distance of a particular phase (Kernel_dphase_i) in the customer data evolution path that the new customer data segmentation belongs to, illustrative embodiments determine that the new customer data segmentation belongs to that particular phase. In other words, the new customer data segmentation can only be one phase's alternative in the customer data evolution path. The phase with the least distance ratio (e.g., Kernel_dSegnew/Kernel_dphase_i), wins the alternative.

In addition, illustrative embodiments perform an analysis of the generated customer data evolution paths to identify customer behavior patterns and trends over time to, for example, detect abnormal behavior patterns and trends, determine potential marketing strategies, and the like. Thus, illustrative embodiments increase a computer's performance in identifying customer behavior patterns and trends in a set of customer data based on the customer data evolution paths generated by illustrative embodiments. Illustrative embodiments can also perform a set of action steps (e.g., execute a set of countermeasures) in response to identifying certain behavior patterns and trends (e.g., unauthorized customer data access).

Thus, illustrative embodiments provide one or more technical solutions that overcome a technical problem with identifying customer behavior patterns and trends in data. As a result, these one or more technical solutions provide a technical effect and practical application in the field of data segmentation, analysis, and security using a novel method of generating customer data evolution paths to identify abnormal behavior patterns and trends over time and perform action steps to prevent unauthorized data access and, thereby, increase data security.

Figure 3:
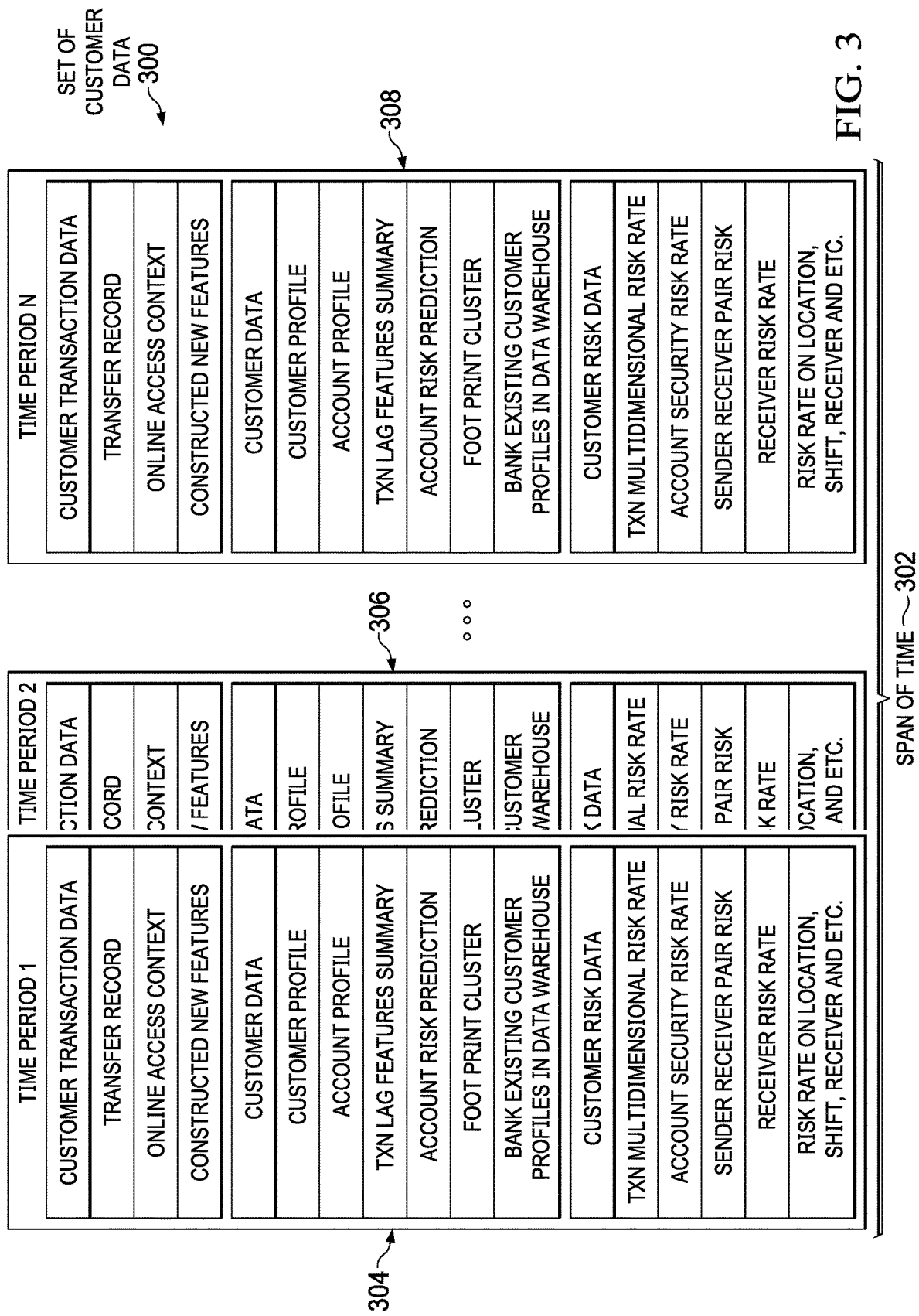
FIG. 3 is an example of a set of customer data in accordance with an illustrative embodiment.

With reference now to FIG. 3, a diagram illustrating an example of a set of customer data is depicted in accordance with an illustrative embodiment. Set of customer data 300 may be implemented in a computer or storage, such as, for example, server 104 or storage 108 in FIG. 1. Set of customer data 300 may represent any type of customer data corresponding to any type of data domain, such as, for example, banking, finance, education, entertainment, or the like.

In this example, set of customer data 300 corresponds to span of time 302. In this example, span of time 302 represents a span of 8 months. However, span of time 302 may represent any time interval, such as, for example, 4 weeks, 3 months, 6 months, one year, or the like. Span of time 302 may be manually defined be a user or may be automatically defined by a computer, such as, for example, server 104 in FIG. 1 or data processing system 200 in FIG. 2, based on criteria.

Span of time 302 is comprised of a plurality of defined time periods, such as time period 1 304, time period 2 306, to time period N 308. In this example, a defined time period is equal to a one-month period of time. As a result, in this example, 8 defined time periods (e.g., the months of February, March, April, May, June, July, August, and September) are included in span of time 302. However, a defined time period may be any period of time, such as, for example, 1 hour, 12 hours, 1 day, 1 week, 2 weeks, or the like.

In this example, each of time period 1 304, time period 2 306, to time period N 308 includes customer transaction data, customer data, and customer risk data. However, it should be noted that the defined time periods may include any type of customer-related data.

Based on the customer-related data contained in time period 1 304, time period 2 306, to time period N 308, the computer generates a predefined number of customer data segmentations for each respective defined time period using a clustering algorithm. It should be noted that the computer may utilize any type of clustering algorithm to generate the customer data segmentations. Further, the computer calculates a cluster centroid and kernel distance for each customer data segmentation in one defined time period to determine a successor customer data segmentation in the next defined time period. The computer generates customer data evolution paths using the succession of customer data segmentations corresponding to different time periods to form phases of respective customer data evolution paths. The computer generates statistical characteristics of each respective customer data evolution path and each respective phase of that particular customer data evolution path. The computer uses the statistical characteristics of each respective customer data evolution path and its phases to determine which customer data evolution path and phase a new customer data segmentation detected in new incoming customer data belongs to. Further, the computer analyzes the customer data evolution paths to identify abnormal behavior patterns, such as, for example, unauthorized data access. Furthermore, the computer automatically performs one or more action steps to mitigate the identified abnormal behavior, such as, for example, notifying network security and suspending access to the data, to increase data security.

Figure 4:
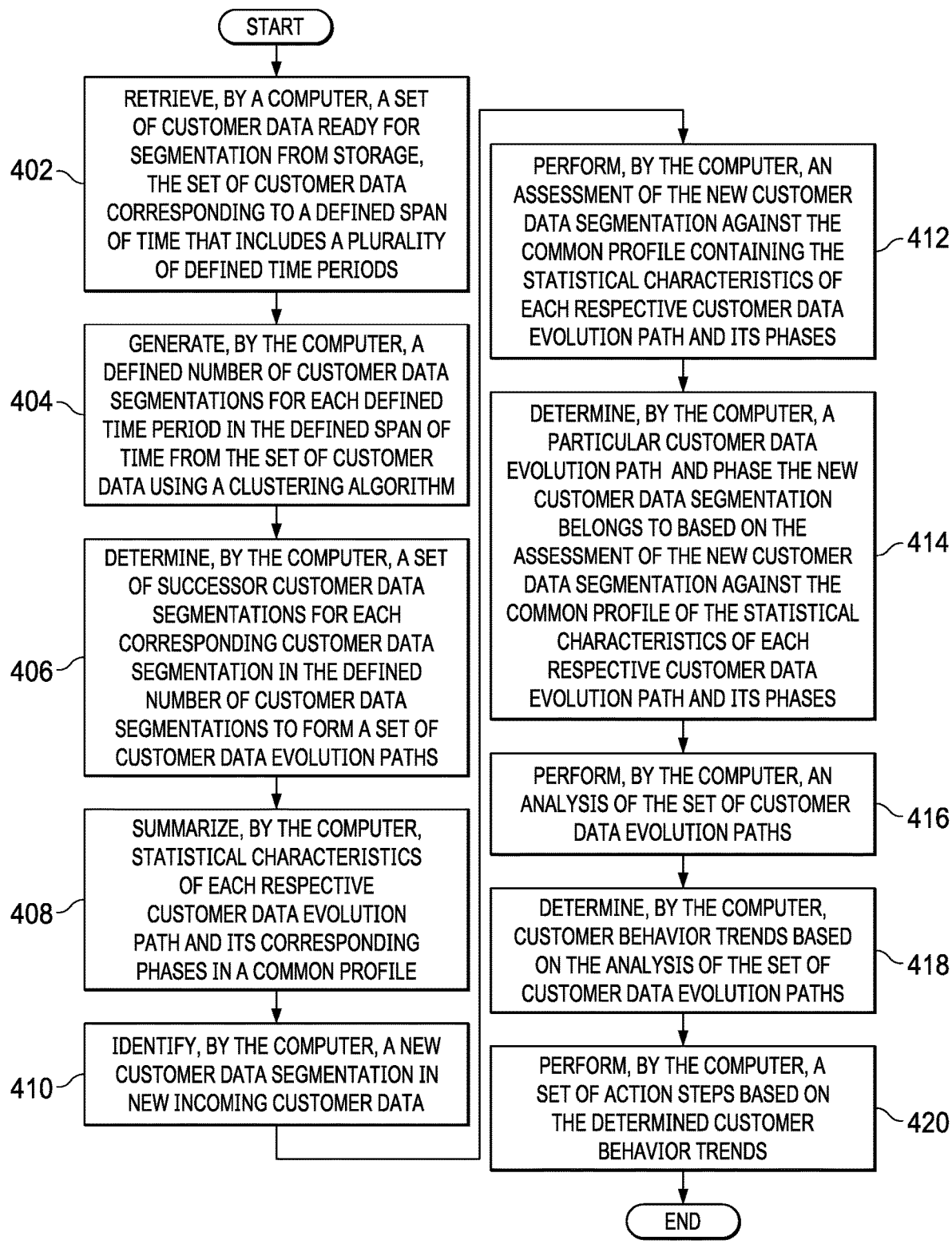
FIG. 4 is a flowchart illustrating a process for customer data segmentation, analysis, and security in accordance with an illustrative embodiment.

With reference now to FIG. 4, a flowchart illustrating a process for customer data segmentation, analysis, and security is shown in accordance with an illustrative embodiment. The process shown in FIG. 4 may be implemented in a computer, such as, for example, server 104 in FIG. 1 or data processing system 200 in FIG. 2. For example, the process shown in FIG. 4 may be implemented in customer data segmentation and security manager 218 in FIG. 2.

The process begins when the computer retrieves a set of customer data ready for segmentation from storage (step 402). The set of customer data may be, for example, set of customer data 300 in FIG. 3. In addition, the set of customer data corresponds to a defined span of time that includes a plurality of defined time periods, such as, for example, span of time 302 that includes time period 1 304, time period 2 306, to time period N 308 in FIG. 3. The storage may be, for example, storage 108 in FIG. 1.

In response to retrieving the set of customer data, the computer generates a defined number of customer data segmentations for each defined time period in the defined span of time from the set of customer data using a clustering algorithm (step 404). Afterward, the computer determines a set of successor customer data segmentations for each corresponding customer data segmentation in the plurality of customer data segmentations to form a set of customer data evolution paths (step 406). The computer summarizes statistical characteristics of each respective customer data evolution path and its phases in a common profile (step 408).

Subsequently, the computer identifies a new customer data segmentation in new incoming customer data (step 410). The computer performs an assessment of the new customer data segmentation against the common profile containing the statistical characteristics of each respective customer data evolution path and its phases (step 412). The computer determines a particular customer data evolution path and phase the new customer data segmentation belongs to based on the assessment of the new customer data segmentation against the common profile of the statistical characteristics of each respective customer data evolution path and its phases (step 414).

Further, the computer performs an analysis of the set of customer data evolution paths (step 416). The computer determines customer behavior trends (e.g., an abnormal behavior trend such as unauthorized data access) based on the analysis of the set of customer data evolution paths (step 418). The computer automatically performs a set of action steps (e.g., perform unauthorized data access countermeasures such as deny unauthorized user access to sensitive data) based on the determined customer behavior trends (step 420). Thereafter, the process terminates.

Thus, illustrative embodiments of the present invention provide a computer-implemented method, computer system, and computer program product for generating customer data evolution paths using customer data segmentations corresponding to different time periods within a defined time span to discover customer behavior patterns and trends over time and performing appropriate action steps when an abnormal pattern or trend is detected via analyzing the generated customer data evolution paths. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data segmentation, analysis, and security, the computer-implemented method comprising:
retrieving, by a computer, a set of customer data collected over a defined span of time;
generating, by the computer, a defined number of customer data segmentations for each time period in the defined span of time from the set of customer data collected over the defined span of time using a clustering algorithm;
generating, by the computer, a set of customer data evolution paths by linking successor customer data segmentations from different time periods within the defined span of time based on profiling statistical characteristics of each customer data segmentation of the defined number of customer data segmentations corresponding to the different time periods in the defined span of time;
performing, by the computer, an analysis of the set of customer data evolution paths linking successor customer data segmentations from the different time periods within the defined span of time;
determining, by the computer, a behavior trend based on the analysis of the set of customer data evolution paths linking successor customer data segmentations from the different time periods within the defined span of time, wherein the determined behavior trend is an abnormal customer behavior pattern indicating unauthorized customer data access; and
automatically performing, by the computer, a set of data security countermeasures corresponding to the abnormal customer behavior pattern indicating the unauthorized customer data access to mitigate the abnormal customer behavior pattern and increase data security based on the determined behavior trend.

2. The computer-implemented method of claim 1, wherein the computer calculates a cluster centroid for each customer data segmentation in the defined number of customer data segmentations and a kernel distance to define kernel area for the each customer data segmentation in the defined number of customer data segmentations, wherein the kernel distance is a distance of a record to its corresponding cluster centroid.

3. The computer-implemented method of claim 1 further comprising:
determining, by the computer, a set of successor customer data segmentations for each corresponding customer data segmentation in the defined number of customer data segmentations to form the set of customer data evolution paths; and
summarizing, by the computer, the statistical characteristics of each respective customer data evolution path in the set of customer data evolution paths and its corresponding phases in a common profile.

4. The computer-implemented method of claim 3, wherein, for a given customer data segmentation in the defined number of customer data segmentations in a given time period in the defined span of time, the computer calculates a successor customer data segmentation in a next time period in the defined span of time for the given customer data segmentation by calculating cluster centroid distances between data segmentations in the next time period and a cluster centroid of the given customer data segmentation for a current time period, and wherein when a cluster centroid distance of a particular customer data segmentation in the next time period is less than a kernel distance of the given customer data segmentation, the computer determines that the particular customer data segmentation in the next time period is the successor customer data segmentation of the given customer data segmentation.

5. The computer-implemented method of claim 3, wherein, for a given customer data evolution path in the set of customer data evolution paths, the computer summarizes the statistical characteristics of position of the given customer data evolution path and dispersion of the given customer data evolution path in the common profile, and wherein the computer calculates the position of the given customer data evolution path using cluster centroids for all phases in the given customer data evolution path, and wherein the computer calculates the dispersion of the given customer data evolution path using distances between the position of the given customer data evolution path and cluster centroids of respective phases in the given customer data evolution path.

6. The computer-implemented method of claim 5, wherein, for a given phase in the given customer data evolution path, the computer summarizes the statistical characteristics of deviation of the given phase from the given customer data evolution path and deviation of the given phase from an origin of the given customer data evolution path in the common profile, and wherein the computer calculates the deviation of the given phase from the given customer data evolution path using a distance from a cluster centroid of the given phase to the position of the given customer data evolution path, and wherein the computer calculates the deviation of the given phase from the origin of the given customer data evolution path using a distance from the cluster centroid of the given phase to a cluster centroid of the origin of the given customer data evolution path.

7. The computer-implemented method of claim 3 further comprising:
identifying, by the computer, a new customer data segmentation in new incoming customer data;
performing, by the computer, an assessment of the new customer data segmentation against the common profile containing the statistical characteristics of each respective customer data evolution path and its phases; and
determining, by the computer, a particular customer data evolution path and phase the new customer data segmentation belongs to based on the assessment of the new customer data segmentation against the common profile of the statistical characteristics of each respective customer data evolution path and its phases.

8. The computer-implemented method of claim 7, wherein when a kernel distance of the new customer data segmentation to a position of a particular customer data evolution path is less than a median of kernel distances of phases in the particular customer data evolution path, the computer determines that the new customer data segmentation belongs to the particular customer data evolution path, and wherein when the kernel distance of the new customer data segmentation is less than a kernel distance of a particular phase in the particular customer data evolution path that the new customer data segmentation belongs to, the computer determines that the new customer data segmentation belongs to the particular phase.

9. The computer-implemented method of claim 8, wherein a customer data segmentation in a customer data evolution path of the set of customer data evolution paths is a phase of that customer data evolution path.

10. A computer system for data segmentation, analysis, and security, the computer system comprising:
a bus system;
a storage device connected to the bus system, wherein the storage device stores program instructions; and
a processor connected to the bus system, wherein the processor executes the program instructions to:
retrieve a set of customer data collected over a defined span of time;
generate a defined number of customer data segmentations for each time period in the defined span of time from the set of customer data collected over the defined span of time using a clustering algorithm;
generate a set of customer data evolution paths by linking successor customer data segmentations from different time periods within the defined span of time based on profiling statistical characteristics of each customer data segmentation of the defined number of customer data segmentations corresponding to the different time periods in the defined span of time;
perform an analysis of the set of customer data evolution paths linking successor customer data segmentations from the different time periods within the defined span of time;
determine a behavior trend based on the analysis of the set of customer data evolution paths linking successor customer data segmentations from the different time periods within the defined span of time, wherein the determined behavior trend is an abnormal customer behavior pattern indicating unauthorized customer data access; and automatically perform a set of data security countermeasures corresponding to the abnormal customer behavior pattern indicating the unauthorized customer data access to mitigate the abnormal customer behavior pattern and increase data security based on the determined behavior trend.

11. The computer system of claim 10, wherein the processor further executes the program instructions to:

determine a set of successor customer data segmentations for each corresponding customer data segmentation in the defined number of customer data segmentations to form the set of customer data evolution paths; and summarize the statistical characteristics of each respective customer data evolution path in the set of customer data evolution paths and its corresponding phases in a common profile.

12. The computer system of claim 11, wherein, for a given customer data segmentation in the defined number of customer data segmentations in a given time period in the defined span of time, the computer system calculates a successor customer data segmentation in a next time period in the defined span of time for the given customer data segmentation by calculating cluster centroid distances between data segmentations in the next time period and a cluster centroid of the given customer data segmentation for a current time period, and wherein when a cluster centroid distance of a particular customer data segmentation in the next time period is less than a kernel distance of the given customer data segmentation, the computer system determines that the particular customer data segmentation in the next time period is the successor customer data segmentation of the given customer data segmentation.

13. A computer program product for data segmentation, analysis, and security, the computer program product comprising a computer-readable storage medium having program instructions embodied therewith, the program instructions executable by a computer to cause the computer to perform a method of:

retrieving, by the computer, a set of customer data collected over a defined span of time;

generating, by the computer, a defined number of customer data segmentations for each time period in the defined span of time from the set of customer data collected over the defined span of time using a clustering algorithm;

generating, by the computer, a set of customer data evolution paths by linking successor customer data segmentations from different time periods within the defined span of time based on profiling statistical characteristics of each customer data segmentation of the defined number of customer data segmentations corresponding to the different time periods in the defined span of time;

performing, by the computer, an analysis of the set of customer data evolution paths linking successor customer data segmentations from the different time periods within the defined span of time;

determining, by the computer, a behavior trend based on the analysis of the set of customer data evolution paths linking successor customer data segmentations from the different time periods within the defined span of time, wherein the determined behavior trend is an abnormal customer behavior pattern indicating unauthorized customer data access; and automatically performing, by the computer, a set of data security countermeasures corresponding to the abnormal customer behavior pattern indicating the unauthorized customer data access to mitigate the abnormal customer behavior pattern and increase data security based on the determined behavior trend.

14. The computer program product of claim 13 further comprising:

determining, by the computer, a set of successor customer data segmentations for each corresponding customer data segmentation in the defined number of customer data segmentations to form the set of customer data evolution paths; and summarizing, by the computer, the statistical characteristics of each respective customer data evolution path in the set of customer data evolution paths and its corresponding phases in a common profile.

15. The computer program product of claim 14, wherein, for a given customer data segmentation in the defined number of customer data segmentations in a given time period in the defined span of time, the computer calculates a successor customer data segmentation in a next time period in the defined span of time for the given customer data segmentation by calculating cluster centroid distances between data segmentations in the next time period and a cluster centroid of the given customer data segmentation for a current time period, and wherein when a cluster centroid distance of a particular customer data segmentation in the next time period is less than a kernel distance of the given customer data segmentation, the computer determines that the particular customer data segmentation in the next time period is the successor customer data segmentation of the given customer data segmentation.

16. The computer program product of claim 15, wherein, for a given customer data evolution path in the set of customer data evolution paths, the computer summarizes the statistical characteristics of position of the given customer data evolution path and dispersion of the given customer data evolution path in the common profile, and wherein the computer calculates the position of the given customer data evolution path using cluster centroids for all phases in the given customer data evolution path, and wherein the computer calculates the dispersion of the given customer data evolution path using distances between the position of the given customer data evolution path and cluster centroids of respective phases in the given customer data evolution path.

* * * * *